US006176547B1

(12) United States Patent
François et al.

(10) Patent No.: US 6,176,547 B1
(45) Date of Patent: Jan. 23, 2001

(54) FIRST/SECOND-CLASS CONVERTIBLE TWO-SEATER SEAT AND METHOD OF CONVERTING SUCH A SEAT

(75) Inventors: Duran D. François, Rochefort; Alain Guinot, Thaire, both of (FR)

(73) Assignee: Alstom Transport SA, Paris (FR)

( * ) Notice: Under 35 U.S.C. 154(b), the term of this patent shall be extended for 0 days.

(21) Appl. No.: 09/249,578

(22) Filed: Feb. 12, 1999

(30) Foreign Application Priority Data

Feb. 12, 1998 (FR) ..................................................... 98 01678

(51) Int. Cl.[7] ..................................................... B64D 11/06

(52) U.S. Cl. ................. 297/257; 297/411.26; 244/118.6; 244/122 R

(58) Field of Search ..................................... 297/248, 257, 297/411.26; 244/118.6, 122 R

(56) References Cited

U.S. PATENT DOCUMENTS 4,881,702 * 11/1989 Slettebak .............................. 297/257
5,104,065 * 4/1992 Daharsh et al. ................. 297/257 X
5,284,379 * 2/1994 Arnold et al. .................. 297/257 X
5,597,139 * 1/1997 Beroth ................................. 297/248
5,727,845 * 3/1998 Jackson-Wynch .................. 297/257

FOREIGN PATENT DOCUMENTS 0 322 930 7/1989 (EP) .
0 685 477 6/1995 (EP) .
0 680 843 11/1995 (EP) .
0 747 286 12/1996 (EP) .

* cited by examiner

*Primary Examiner*—Anthony D. Barfield
(74) *Attorney, Agent, or Firm*—Young & Thompson

(57) ABSTRACT

A convertible first/second-class seat offering a given number N of seating spaces convertible into a second/first-class N-seater seat, provides N seats with N seat cushions and 2N armrests, the first/second-class convertible seat includes a device for translating at least one of the N seat cushions and at least one of the 2N armrests, the N seat cushions and the 2N armrests remaining mutually aligned, translations T obtained by the translation device allowing the seat cushions that are to be translated to be moved further apart when the second-class convertible seat is converted into a first-class seat, or allowing the seat cushions that are to be translated to be moved closer together when the first-class convertible seat is converted into a second-class seat.

11 Claims, 3 Drawing Sheets

FIRST/SECOND-CLASS CONVERTIBLE TWO-SEATER SEAT AND METHOD OF CONVERTING SUCH A SEAT

BACKGROUND OF THE INVENTION

The present invention relates to first- and second-class seats, particularly for public transport vehicles, in general, and relates more specifically to a first/second-class convertible two-seater seat, and to a method for converting such a seat.

DESCRIPTION OF THE RELATED ART

The only solution currently available for changing a first-class seat into a second-class seat and conversely for changing a second-class seat into a first-class seat, particularly in a public transport vehicle area is to replace the seats.

Thus, the only way of changing the category of the area in a road or rail public-transport vehicle is to replace the seats.

SUMMARY OF THE INVENTION

Thus, an object of the invention is a first/second-class convertible two-seater seat that will allow an area of a given class to be converted into an area of another class without removing seats.

In accordance with the invention, the first/second-class convertible two-seater seat and the method of converting such a seat are as defined in the claims.

In particular, the present invention consists in a convertible first/second-class seat offering a given number N of seating spaces, the said first/second-class convertible seat being convertible into a second/first-class N-seater seat, the said first/second-class convertible seat having N seats with N seat cushions and 2N armrests, the said first/second-class convertible seat comprising means of translating at least one of the said N seat cushions and at least one of the said 2N armrests, the said N seat cushions and the said 2N armrests remaining mutually aligned, translations T of the seat cushions and armrests obtained by means of the said translation means allowing the said seat cushions that are to be translated and the said armrests that are to be translated to be moved further apart when the said second-class convertible seat is converted into a first-class seat, or allowing the said seat cushions that are to be translated and the said armrests that are to be translated to be moved closer together when the said first-class convertible seat is converted into a second-class seat.

The invention also consists in a method of converting between first- and second-class, a convertible seat which offers a given number N of seating spaces, the said first/second-class convertible seat having N seats with N seat cushions and 2N armrests, the said method comprising steps allowing:

- the said first/second-class convertible seat to be converted into a second/first-class N-seater seat, and
- at least one of the said N seat cushions and at least one of the said 2N armrests to be translated by means of translation means built into the said first/second-class convertible seat, the said N seat cushions and the said 2N armrests remaining mutually aligned,
- the translations T of the seat cushions and of the armrests obtained by means of the said translation means allowing the said seat cushions that are to be translated and the said armrests that are to be translated to be moved further apart when the said second-class convertible seat is converted into a first-class seat, or allowing the said seat cushions that are to be translated and the said armrests that are to be translated to be brought closer together when the said first-class convertible seat is converted into a second-class seat.

One advantage of the first/second-class convertible two-seater seat and of the method of converting such a seat of the invention is that the time taken to convert an area from a given class into an area of another class is very short and allows the capacity of the train to be altered on the spot.

Another advantage of the first/second-class convertible two-seater seat and of the method of converting such a seat of the invention is that it allows the operator to alleviate the problems of variations in demand between weekends and weekdays for example.

Another advantage of the first/second-class convertible two-seater seat and of the method of converting such a seat of the invention is that it optimizes the number of seats offered on trains which do not change in terms of the number of trailers.

BRIEF DESCRIPTION OF THE DRAWINGS

Other objects, characteristics and advantages of the invention will emerge from reading the description of the preferred embodiment of a first/second-class convertible two-seater seat and the description of the method for converting such a seat, which description is given in conjunction with the drawings in which.

DESCRIPTION OF THE PREFERRED EMBODIMENTS

Figure 1A:
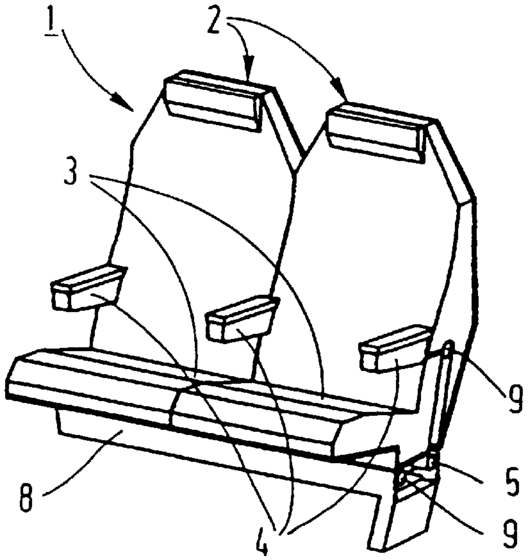
FIG. 1A is an overall view of a first/second-class convertible two-seater seat in accordance with the invention, the seat being converted to form a second-class two-seater seat.
Figure 1B:
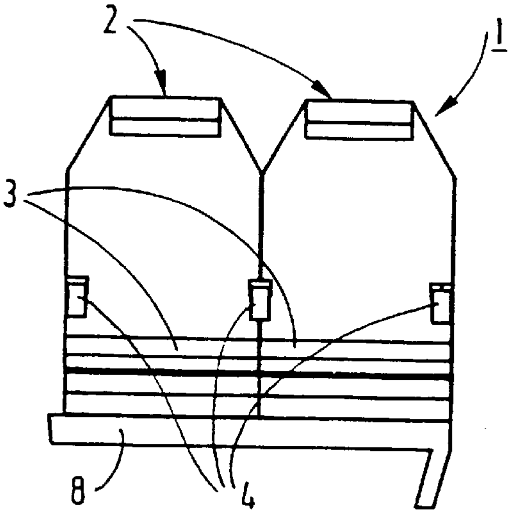
FIG. 1B is a front view of the first/second-class convertible two-seater seat in accordance with the invention depicted in FIG. 1A, in which the seat is converted to form a second-class two-seater seat.
Figure 2A:
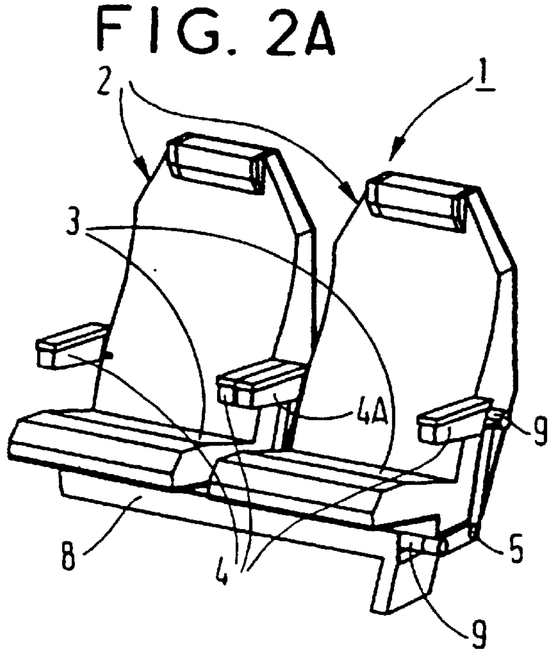
FIG. 2A is an overall view of a first/second-class convertible two-seater seat in accordance with the invention, the seat being converted to form a first-class two-seater seat.
Figure 2B:
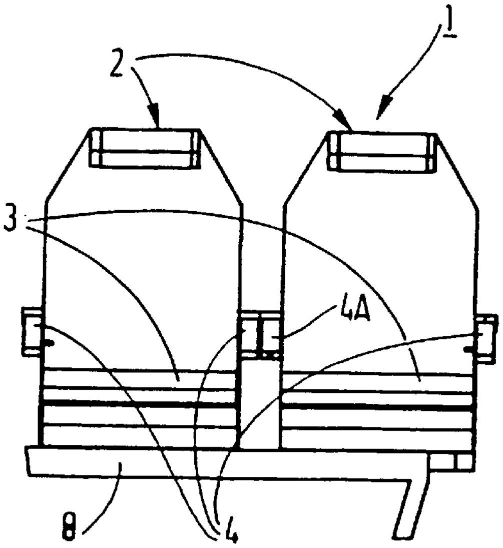
FIG. 2B is an overall view of the first/second-class convertible two-seater seat in accordance with the invention depicted in FIG. 2A, in which the seat is converted to form a first-class two-seater seat.
Figure 1C:
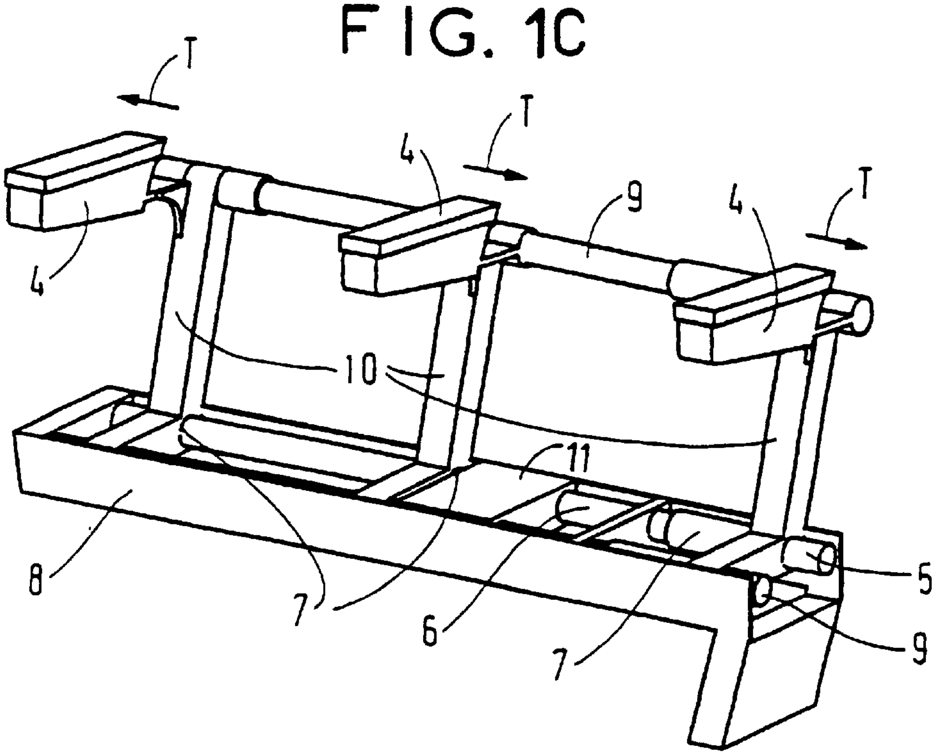
FIG. 1C is an overall view of the chassis of the first/second-class convertible two-seater seat in accordance with the invention depicted in FIG. 1A, in which the seat is converted to form a second-class two-seater seat.
Figure 2C:
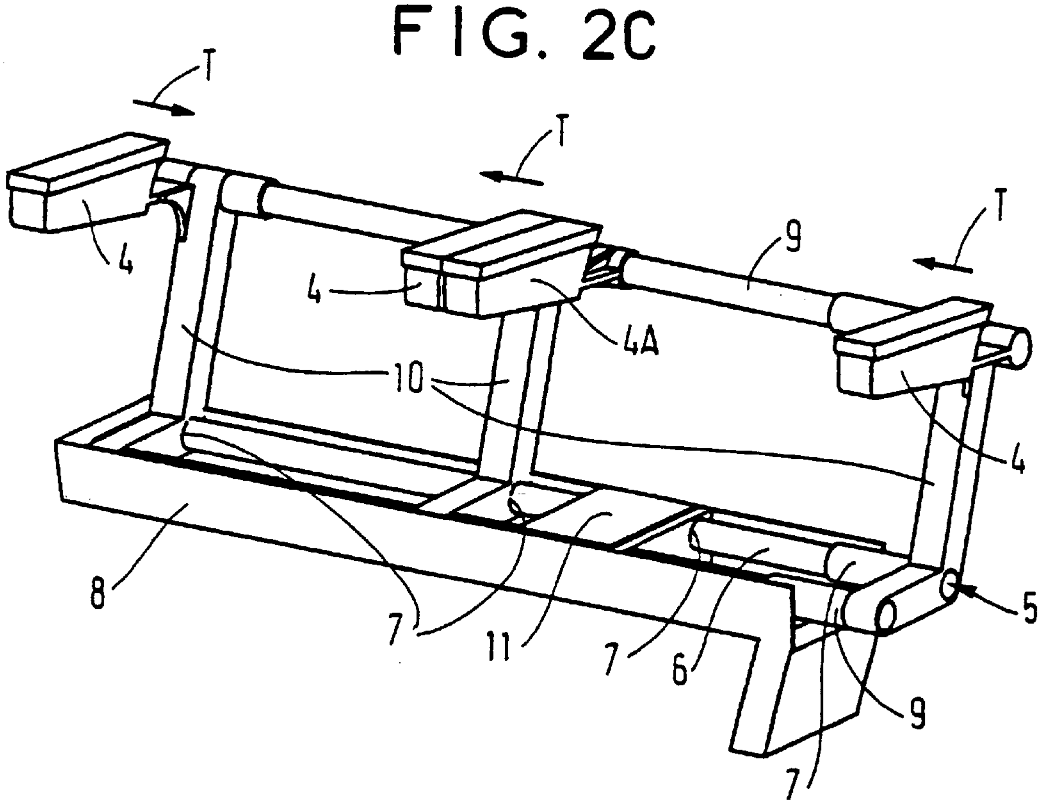
FIG. 2C is an overall view of the chassis of the first/second-class convertible two-seater seat in accordance with the invention depicted in FIG. 2A, in which the seat is converted to form a first-class two-seater seat.
Figure 1D:
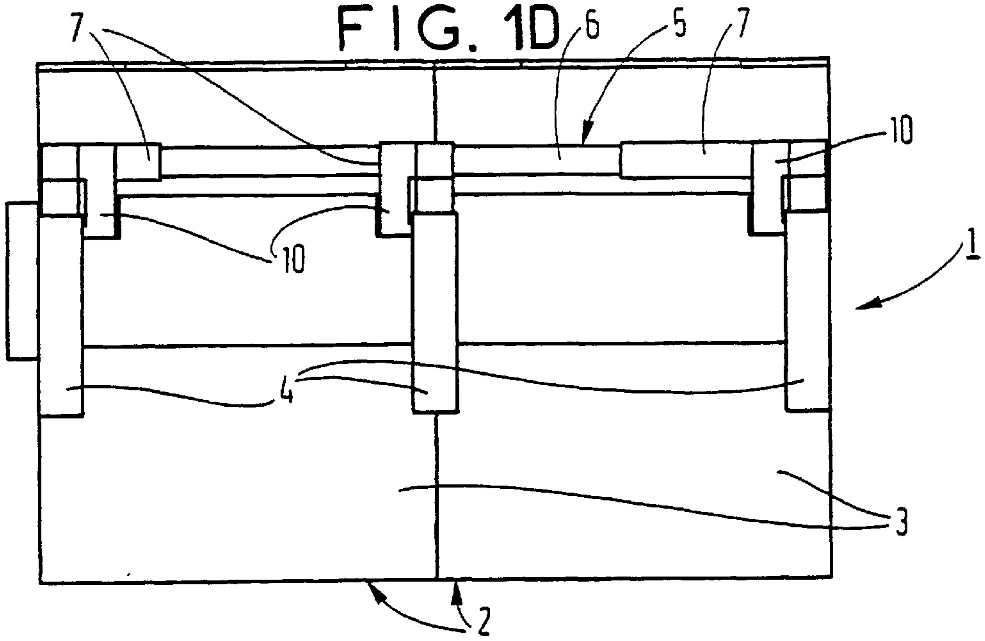
FIG. 1D depicts a plan view of the first/second-class convertible two-seater seat in accordance with the invention depicted in FIG. 1A, in which the seat is converted to form a second-class two-seater seat.
Figure 3:
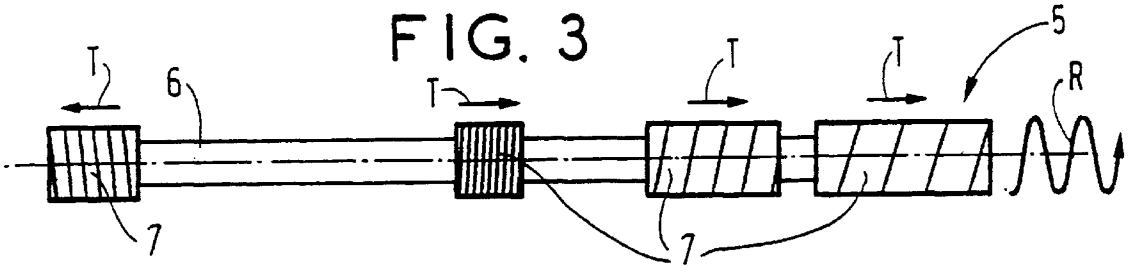
FIG. 3 depicts the means of translating the armrests and seat cushions of the first/second-class convertible two-seater seat in accordance with the invention.
Figure 2D:
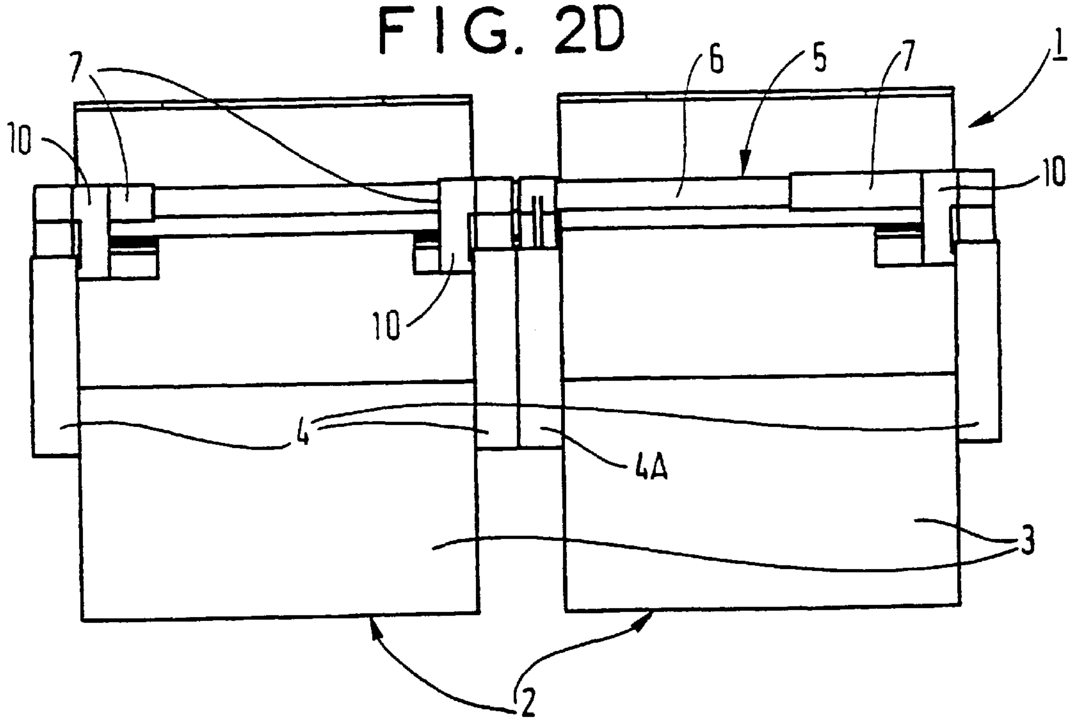
FIG. 2D depicts a plan view of the first/second-class convertible two-seater seat in accordance with the invention depicted in FIG. 2A, in which the seat is converted to form a first-class two-seater seat.

The present invention consists in keeping the seats that form the first/second-class convertible two-seater seat which has a given number of seating spaces and in changing the position of some of these seats so as to alter the width of the seat fixture.

By way of example, a second-class two-seater seat is converted into a first-class two-seater seat by moving the seat cushions and armrests of the second-class seat further apart.

In general, a second-class N-seater seat (where N is a whole number) is converted into a first-class N-seater seat by moving the seat cushions and the armrests of the second-class seat further apart.

The first/second-class convertible seat 1 that offers a given number N of seating spaces when configured as a first-class seat can be converted into a second-class seat also with N seating spaces, and vice versa.

The first/second-class convertible seat 1 when configured as a second-class seat has N seats 2 with N seat cushions 3 and N+1 usable armrests 4.

The first/second-class convertible seat 1 comprises translation means 5 for translating at least one of the N seat cushions 3 and at least one of the N+1 armrests 4.

The N seat cushions 3 and the N+1 armrests 4 remain mutually aligned after conversion.

Translations T of the seat cushions and of the armrests are achieved by means of translation means 5 so as to move the seat cushions that are to be translated and the armrests that are to be translated further apart when the second-class convertible seat is converted into a first-class seat, or so as to bring the seat cushions that are to be translated and the armrests that are to be translated closer together when the first-class convertible seat 1 is converted into a second-class seat.

The seat is, for example, such that during the conversion, at least one seat cushion 3 or at least one seat cushion 3 and at least one armrest 4 are fixed, for example the seat cushion at one of the ends or the seat cushion at one of the ends and all of the armrests.

The means 5 of translating the seat cushions 3 that are to be translated and the armrests 4 that are to be translated are made up of a translation shaft 6 which can be rotated R and comprises a translation element 7 associated with each armrest 4 that is to be translated and each seat cushion 3 that is to be translated.

In accordance with the preferred embodiment, the translation elements 7 for the armrests 4 and the seat cushions 3 that are to be translated are made up of variable-pitch screws of which the screw pitch and length of the active region comprising the screw thread increase with the separation between the armrests 4 that are to be translated and the seat cushions 3 that are to be translated with respect to the fixed armrests 4 and seat cushions 3.

The screw threads of the translation elements 7 are either left-hand threads in the case of some of these translation elements 7 or right-hand threads in the case of the other translation elements 7, and depend on the transformation T that is to be achieved.

The seat according to the invention comprises a chassis 8 supporting the translation shaft 6 and at least one guide shaft 9 for guiding the armrests 4 that are to be translated and the seat cushions 3 that are to be translated.

The translation shaft 6 and the guide shafts 9 support armrest supports 10 that can move in terms of translation and seat cushion supports 11 that can move in terms of translation.

The moving armrest supports 10 that are to be translated are translated by means of the translation elements associated with each armrest that is to be translated.

Likewise, the moving seat cushion supports 11 that are to be translated are translated by means of the translation elements 7 associated with each seat cushion that is to be translated.

An additional armrest 4A is advantageously inserted between each seat 2 when the second-class convertible seat is converted into a first-class seat.

As the armrests and seat cushions are, for example, mounted on slideways so as to allow for their relative displacement and translation, this movement may either be motorized or manual.

There are various systems that may be used for translating the armrests and the seat cushions that are to be translated; for example, it is possible to use variable-pitch screws, linkages (not depicted) or a set of cams (not depicted).

By way of example, various translations are achieved by manual translation of the armrests and seat cushions that are to be translated, using unthreaded guide.

Stops set the extreme positions of the various elements, overall locking being provided, for example by a catch or pawl system, making it possible to prevent any movement after manoeuvre.

The present invention also relates to a method of converting between first- and second-class, a convertible seat 1 which offers a given number N of seating spaces, the first/second-class convertible seat having N seats 2 with N seat cushions and 2N armrests 4, all of which can be used when the seat is converted into a first-class seat.

The method according to the invention comprises steps allowing:

the first/second-class convertible seat 1 to be converted into a second/first-class N-seater seat, and at least one of the N seat cushions 3 and at least one of the 2N armrests 4 to be translated by means of translation means 5 built into the said first/second-class convertible seat 1, the N seat cushions 3 and the 2N armrests 4 remaining mutually aligned.

The translations T of the seat cushions and of the armrests obtained by means of the translation means 5 allow the said seat cushions that are to be translated and the said armrests that are to be translated to be moved further apart when the second-class convertible seat is converted into a first-class seat, or allow the said seat cushions that are to be translated and the said armrests that are to be translated to be brought closer together when the first-class convertible seat 1 is converted into a second-class seat.

The method of converting a seat comprises a step which consists in rotating R the translation shaft 6 incorporated in the means 5 of translating the seat cushions 3 that are to be translated and the armrests 4 that are to be translated, by means of translation elements 7 associated with each armrest 4 that is to be translated and each seat cushion 3 that is to be translated.

The method of converting the seat comprises a step consisting in translating moving armrest supports 10 that are to be translated, by means of the translation elements 7 associated with each armrest that is to be translated, and in translating moving seat cushion supports 11 that are to be translated, by means of the said translation elements 7 associated with each seat cushion that is to be translated.

The method of converting the seat comprises a step consisting in inserting an additional armrest 4A between each seat 2 when the said second-class convertible seat is converted into a first-class seat.

The method of converting the seat comprises a step consisting in removing an additional armrest 4A from between the seats 2 when the first-class convertible seat is converted into a second-class seat.

What is claimed is:

1. A multi-class convertible seat assembly translatable between a first-class seat configuration and a second-class seat configuration, comprising:

a first number of seats portions, all of the seat portions selectively installed in either of the first-class or second-class seat configuration;

seat cushions equal to the first number of seat portions, all of the seat cushions installed selectively in either of the first-class or second-class seat configuration, at least one of said seat cushions being a translatable seat cushion;

armrests equal to twice the first number of seat portions with at least one of the armrests being a removable armrest and at least one of the armrests being a translatable armrest; and a translation means for translating at least one of said translatable seat cushions and at least one of said translatable armrests while maintaining said seat cushions and said armrests mutually aligned, wherein in converting from the first-class seat configuration to the second-class seat configuration said translation means moves said at least one translatable seat cushion and said at least one translatable armrest toward another of the seat cushions and the armrests, and in converting from the second-class seat configuration to the first-class seat configuration said translation means moves said at least one translatable seat cushion and said at least one translatable armrest further apart from the other of the seat cushions and armrests, the move allowing insertion of the removable armrest between two of the seat portions.

2. The multi-class convertible seat assembly of claim 1, wherein one of the seat cushions is a fixed seat cushion.

3. The multi-class convertible seat assembly of claim 2, wherein one of the armrests is a fixed armrest.

4. The multi-class convertible seat assembly of claim 1, wherein said translation means comprises a rotatable translation shaft and translation elements associated with the at least one of said translatable seat cushions and the at least one of said translatable armrests.

5. The multi-class convertible seat assembly of claim 4, wherein each of said translation elements comprises a screw with an active region having a screw pitch and a screw length that increase with a distance between on the one hand said translation element and on the other hand said fixed armrest and said fixed seat cushion.

6. The multi-class convertible seat assembly of claim 5, wherein threads of said translation elements are left-hand threads for at least one of said translation elements and right-hand threads for at least one other of said translation elements.

7. The multi-class convertible seat assembly of claim 4, further comprising:

a chassis supporting said translation shaft;

at least one guide shaft arranged for guiding said at least one translatable armrest and said at least one translatable seat cushion; and at least one armrest support and at least one seat cushion support, supported by said translation shaft and said at least one guide shaft, said at least one armrest support and said at least one seat cushion support movable in translation, said at least one armrest support and said at least one seat cushion support moveable in translation by associated ones of said translation elements.

8. The multi-class convertible seat assembly of claim 1, wherein said removable armrest is configured to be removed for converting from the first-class seat configuration to the second-class seat configuration to allow said translation means to move said at least one seat cushion and said at least one armrest toward said another of the seat cushions and the armrests.

9. A method of converting a multi-class convertible seat assembly having a first number of seating positions, seat cushions equal to the first number of seat portions, and armrests equal to twice the first number of seat portions between a first-class seat configuration and a second-class seat configuration, comprising the steps of:

with a translation means built into said multi-class convertible seat, translating at least one of said seat cushions and at least one of said armrests while keeping said seat cushions and said armrests mutually aligned;

said translating step being performed with the translation means acting to move apart at least two of said seat cushions and at least two of said armrests in converting from the second-class seat configuration into the first-class seat configuration, and said translating step being performed with the translation means acting to move together at least two seat cushions and at least two armrests in converting from the first-class seat configuration into the second-class seat configuration; and in converting from the second-class seat configuration into the first-class seat configuration, inserting a removable armrest between two seating positions associated with the seat cushions, and in converting from the first-class seat configuration into the second-class seat configuration, removing the removable armrest from between the seating positions.

10. The method of claim 9, wherein the further, step of translating the at least one seat cushion and the at least one armrest comprises rotating a translation shaft incorporated in the translation means for activating translation elements associated with each of the at least one armrest and the at least one seat cushion.

11. The method of claim 9, further comprising the steps of;

moving at least one armrest support through a translation element associated with the at least one armrest; and moving at least one seat cushion support through a translation element associated with the at least one seat cushion.

* * * * *

UNITED STATES PATENT AND TRADEMARK OFFICE

CERTIFICATE OF CORRECTION

PATENT NO. : 6,176,547 B1
DATED : January 23, 2001
INVENTOR(S) : François Durand et al.

It is certified that error appears in the above-identified patent and that said Letters Patent is hereby corrected as shown below:

Title page,
Item (12) change 'Fraçois et al." to -- Durand et al. --.

Item (75), the inventorship from "Duran D. François, Rochefort; Alain Guinot, Thaire, both of (FR)" to -- François Durand, Rochefort; Alain Guinot, Thaire, both of (FR) --.

Signed and Sealed this

Second Day of October, 2001

*Attest:*

Nicholas P. Godici

NICHOLAS P. GODICI

*Attesting Officer* *Acting Director of the United States Patent and Trademark Office*